US008608269B2

(12) United States Patent
Usuda et al.

(10) Patent No.: US 8,608,269 B2
(45) **Date of Patent: *Dec. 17, 2013**

(54) FLUID EJECTING APPARATUS, AND FLUID EJECTING METHOD

(75) Inventors: Hidenori Usuda, Matsumoto (JP); Hideo Noro, Minamiminowa-mura (JP); Toshio Kumagai, Shiojiri (JP); Shinichi Kamoshida, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/545,092

(22) Filed: Jul. 10, 2012

(65) Prior Publication Data

US 2012/0274697 A1 Nov. 1, 2012

Related U.S. Application Data

(63) Continuation of application No. 12/490,546, filed on Jun. 24, 2009, now Pat. No. 8,240,792.

(30) Foreign Application Priority Data

Jun. 25, 2008 (JP) ................................ 2008-166315

(51) Int. Cl.
*C09D 11/00* (2006.01)

(52) U.S. Cl.
USPC .......................................................... 347/14

(58) Field of Classification Search
USPC .................................. 347/14, 5, 9, 138, 234
See application file for complete search history.

(56) References Cited

U.S. PATENT DOCUMENTS

| | | | | |
|---|---|---|---|---|
| 5,156,464 | A | 10/1992 | Sakai | |
| 5,262,797 | A | 11/1993 | Boeller et al. | |
| 6,361,137 | B1 * | 3/2002 | Eaton et al. | 347/14 |
| 6,868,244 | B2 * | 3/2005 | Koide | 399/167 |
| 7,753,516 | B2 * | 7/2010 | Yoneyama | 347/102 |
| 2007/0103508 | A1 | 5/2007 | Yoneyama | |
| 2007/0229612 | A1 | 10/2007 | Oyanagi et al. | |

FOREIGN PATENT DOCUMENTS

| | | |
|---|---|---|
| JP | 04-355177 | 12/1992 |
| JP | 08-080655 | 3/1996 |
| JP | 10-278376 | 10/1998 |
| JP | 2000-062150 | 2/2000 |
| JP | 2000-255135 | 9/2000 |
| JP | 2002-099096 | 4/2002 |
| JP | 2002-178496 | 6/2002 |
| JP | 2005-001123 | 1/2005 |

(Continued)

OTHER PUBLICATIONS

U.S. Appl. No. 12/490,546, Mailed Oct. 31, 2011, Office Action.

(Continued)

*Primary Examiner* — Laura Martin
(74) *Attorney, Agent, or Firm* — Workman Nydegger

(57) ABSTRACT

A fluid ejecting apparatus includes a drum that rotates while holding a medium on its outer periphery, a head that ejects a fluid on to the medium held on the periphery of the drum, a fixing section that fixes the fluid ejected on to the medium by the head, a measuring section that measures a diameter of the drum, and a controller that varies an ejection timing of the fluid ejected from the head in accordance with variation in the diameter of the drum measured by the measuring section.

6 Claims, 13 Drawing Sheets

(56) References Cited

FOREIGN PATENT DOCUMENTS

| | | |
|---|---|---|
| JP | 2005-199563 | 7/2005 |
| JP | 2007-069401 | 3/2007 |
| JP | 2007-130790 | 5/2007 |
| JP | 2007-237705 | 9/2007 |
| JP | 2007-320236 | 12/2007 |

OTHER PUBLICATIONS

U.S. Appl. No. 12/490,546, Mailed Apr. 12, 2012, Notice of Allowance.

* cited by examiner

FLUID EJECTING APPARATUS, AND FLUID EJECTING METHOD

CROSS-REFERENCE TO RELATED APPLICATION

This application is a continuation of U.S. patent application Ser. No. 12/490,546 filed Jun. 24, 2009, which claims priority to Japanese Patent Application No. 2008-166315, filed Jun. 25, 2008, which applications are expressly incorporated by reference herein.

BACKGROUND

1. Technical Field

The present invention relates to a fluid ejecting apparatus and a fluid ejecting method.

2. Related Art

An ink jet type printer has been used that forms an image on a medium such that a drum holding the medium on its outer periphery is rotated and a fluid such as ink is ejected on to the medium from a head. In a case where an ultraviolet curable ink is used for a fluid ejected from the head in the above fluid ejecting apparatus, ultraviolet light is radiated to a medium on the drum in order to advance fixing of a fluid deposited on the medium. JP-A-2007-320236 is an example of the related art.

When the drum is irradiated by the ultraviolet light, the drum is heated. As a result, the drum may be expanded by the heat so that the outer diameter possibly varies. When the outer diameter of the drum varies, a distance between the surface of the drum and the head also varies. When the distance between the surface of the drum and the head varies, the position of a fluid deposited on the medium varies. The variation in the position of the fluid deposited on the medium may cause a problem that a deformed image different from an intended image is formed on the medium.

SUMMARY

An advantage of some aspects of the invention is that a fluid is deposited on a medium at an adequate position even when an outer diameter of a drum varies.

A fluid ejecting apparatus according to a first aspect of the invention includes a drum that rotates while holding a medium on its outer periphery, a head that ejects a fluid on to the medium held on the periphery of the drum, a fixing section that fixes the fluid ejected on to the medium by the head, a measuring section that measures a diameter of the drum, and a controller that varies an ejection timing of the fluid ejected from the head in accordance with variation in the diameter of the drum measured by the measuring section.

With the above configuration, it is possible to deposit fluids on adequate positions.

In the fluid ejecting apparatus according to the first aspect of the invention, it is preferable that the fixing section is constituted of a light radiating device. In addition, it is preferable that the fixing section is constituted of an ultraviolet light radiating device. Further, in addition, it is preferable that the radiation rate of the ultraviolet light varies depending on a region on the medium. Further, in addition, it is preferable that the light radiating device and the head are simultaneously moved in an axial direction of the drum.

In the fluid ejecting apparatus according to the first aspect of the invention, it is preferable that the measuring section is moved together with the head. In addition, the measuring section can be provided to an end of the drum in the axial direction.

With the above configuration, a fluid can be deposited on an adequate position in a medium.

A fluid ejection method according to a second aspect of the invention includes the steps of rotating a medium by allowing the medium to be held on a periphery of a drum, ejecting a fluid on to the medium held on the periphery of the drum, fixing the fluid ejected on to the medium, measuring a diameter of the drum, and varying an ejection timing of the fluid in accordance with the measured diameter of the drum.

Accordingly, a fluid can be deposited on an adequate position in a medium. Other characteristics are described below with reference to accompanying drawings.

BRIEF DESCRIPTION OF THE DRAWINGS

The invention will be described with reference to the accompanying drawings, wherein like numbers reference like elements.

DESCRIPTION OF EXEMPLARY EMBODIMENTS

The preferred embodiments according to the invention will be described with reference to the accompanying drawings.

Configuration of Printer 1

Figure 1:
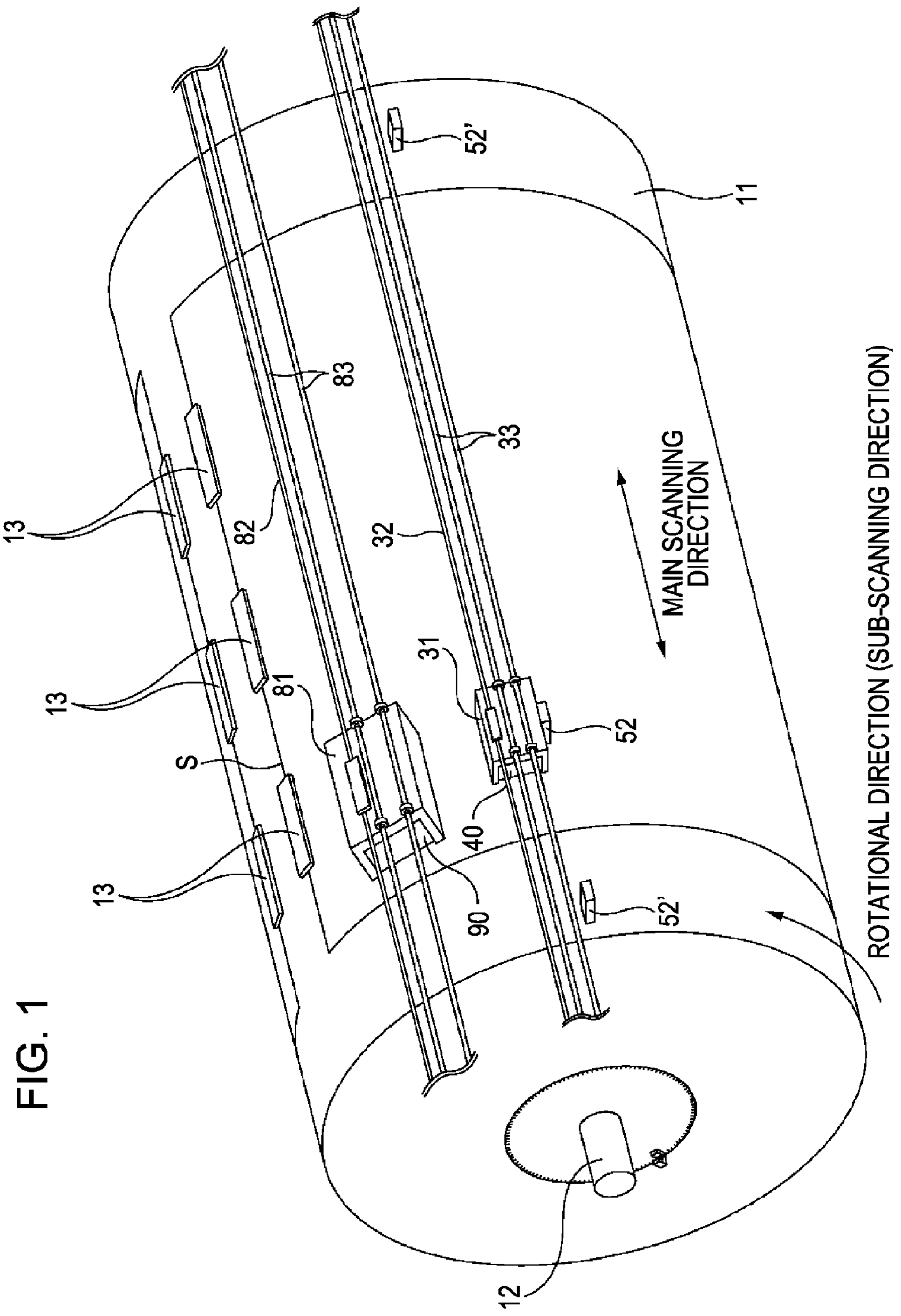
FIG. 1 is a schematic view of a printer 1.
Figure 2:
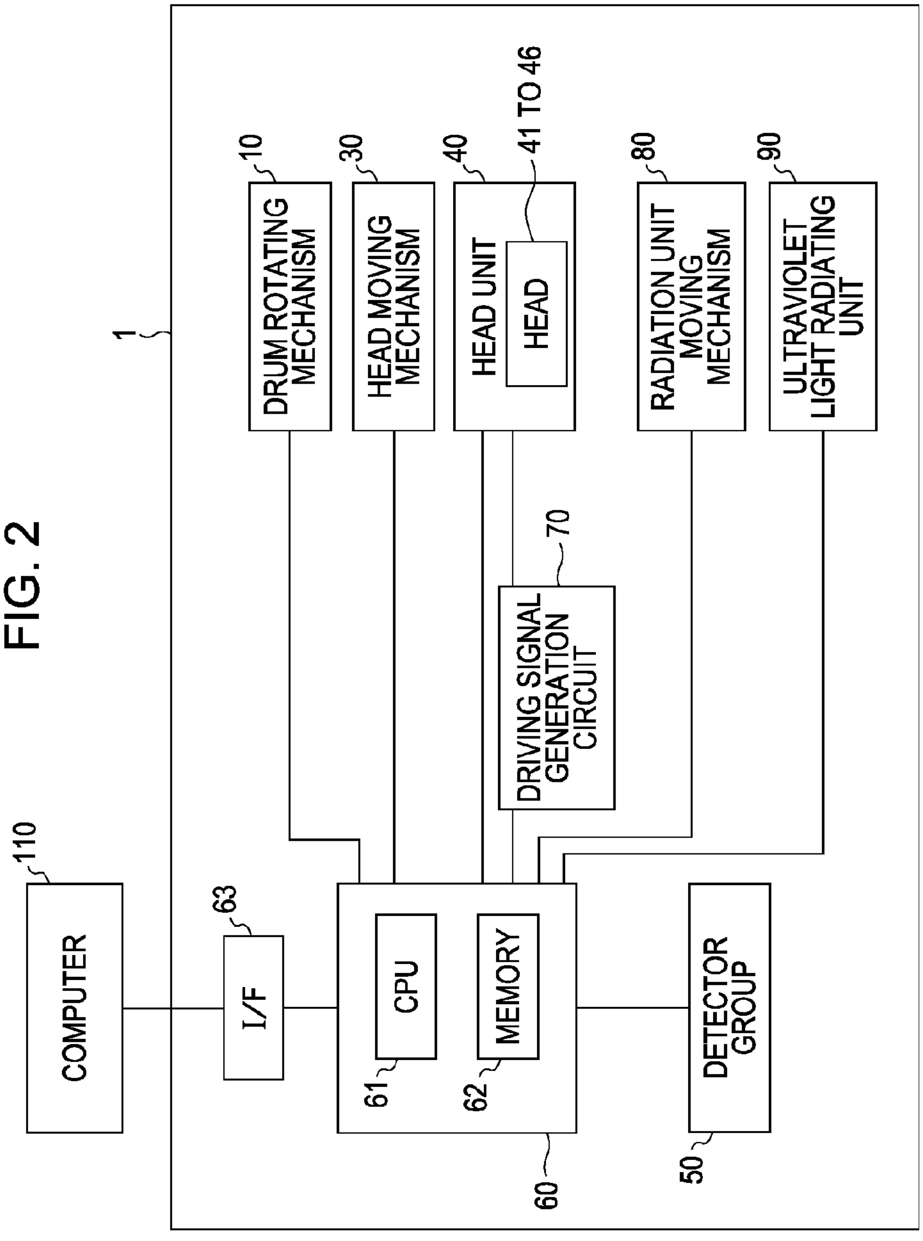
FIG. 2 is a block diagram showing the entire configuration of the printer 1.

FIG. 1 is a schematic view of a printer 1. FIG. 2 is a block diagram showing the entire configuration of the printer 1. The configuration of the printer 1 is described below with reference to the drawings.

The printer 1 includes a drum rotating mechanism 10, a head moving mechanism 30, a head unit 40, a detector group 50, a controller 60, an interface 63, a driving signal generating circuit 70, a radiating unit moving mechanism 80, and an ultraviolet light radiating unit 90.

The drum rotating mechanism 10 is adapted to rotate a drum 11 at a desired speed under control of the controller 60. The drum rotating mechanism 10 includes the drum 11 and a motor (not shown). An output shaft of the motor is coupled to a rotational shaft 12 of the drum 11. The motor is controlled by the controller 60 so that a rotational angular velocity of the drum 11 is controlled.

The drum 11 is adapted to hold a medium such as paper sheet S on its outer periphery. The holding of a medium is carried out such that, for example, an end of the medium is pinched between a holding device 13 and the outer periphery of the drum 11. The holding of the medium can be carried out by a vacuum sucking mechanism configured such that small holes are formed at the outer periphery of the drum 11 and the medium is held by suction.

In the embodiment, it is assumed that the thickness of the medium is extremely small and the outer diameter of the drum 11 includes the thickness of the medium in order to simplify the explanation.

The head moving mechanism 30 is equipped with a carriage 31 for carrying the head unit 40. A belt 32 is attached to the carriage 31. A guide 33 slidably holds the carriage 31 so as to allow the carriage 31 to move in the extending direction (main scanning direction) of the guide 33. The belt 32 is configured so as to move in the main scanning direction by an output of a motor (not shown). The movement of the belt 32 in the main scanning direction causes movement of the carriage 31 in the main scanning direction. Since movement of the belt 32 is controlled by the controller 60, the head unit 40 moves in the main scanning direction under the control of the controller 60.

The head unit 40 is constituted by six heads 41 to 46 as described later. Ink is ejected from each of the heads so that an image is formed on a medium. The head unit 40 is connected to the controller 60 and the driving signal generating circuit 70 via a cable (not shown). A driving signal COM and a signal for controlling the ejection of the ink are transmitted to the head unit 40. In the embodiment, a UV ink (ultraviolet curable ink) is ejected from the head unit 40.

The detector group 50 includes detectors such as a rotary encoder 51 and an outer diameter measuring device 52.

Figure 3:
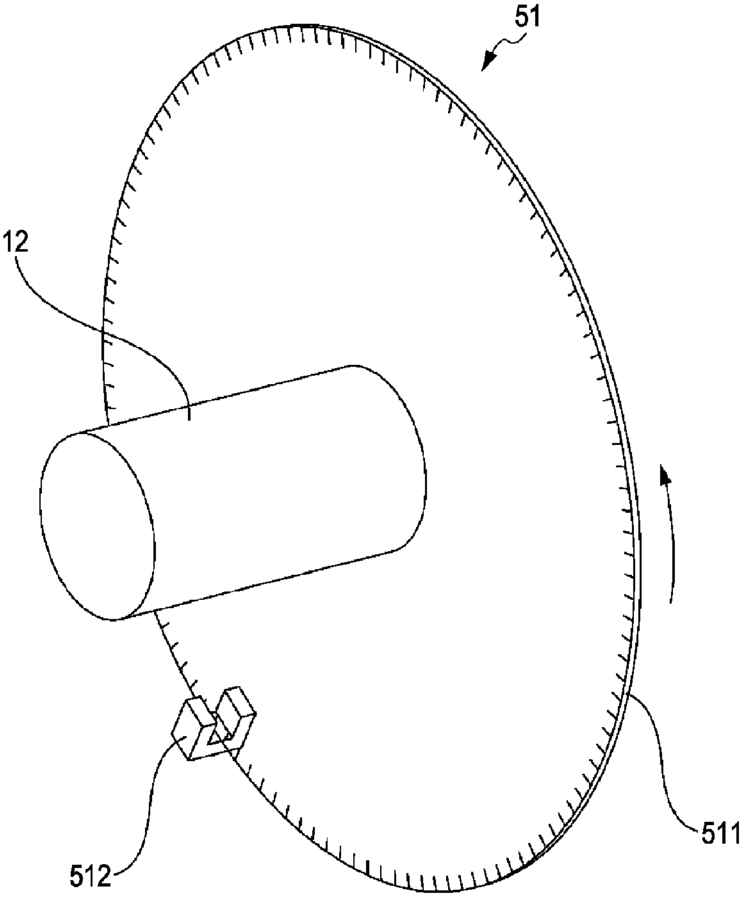
FIG. 3 is an explanatory view showing the rotary encoder 51.

FIG. 3 is an explanatory view showing the rotary encoder 51. The rotary encoder 51 has a rotary disk 511 having multiple slits arranged at predetermined intervals, and a detecting section 512. The rotary disk 511 is fixed to the rotary shaft 12 of the drum 11 so as to be rotated by the rotation of the drum 11. The detecting section 512 is fixed to the printer 1. The rotary encoder 51 outputs a pulse signal ENC to the controller 60 every time the slit provided on the rotary disk 511 passes through the detecting section 512. The controller 60 is configured so as to perform various controls of the printer 1 in accordance with the pulse signal ENC.

Figure 4:
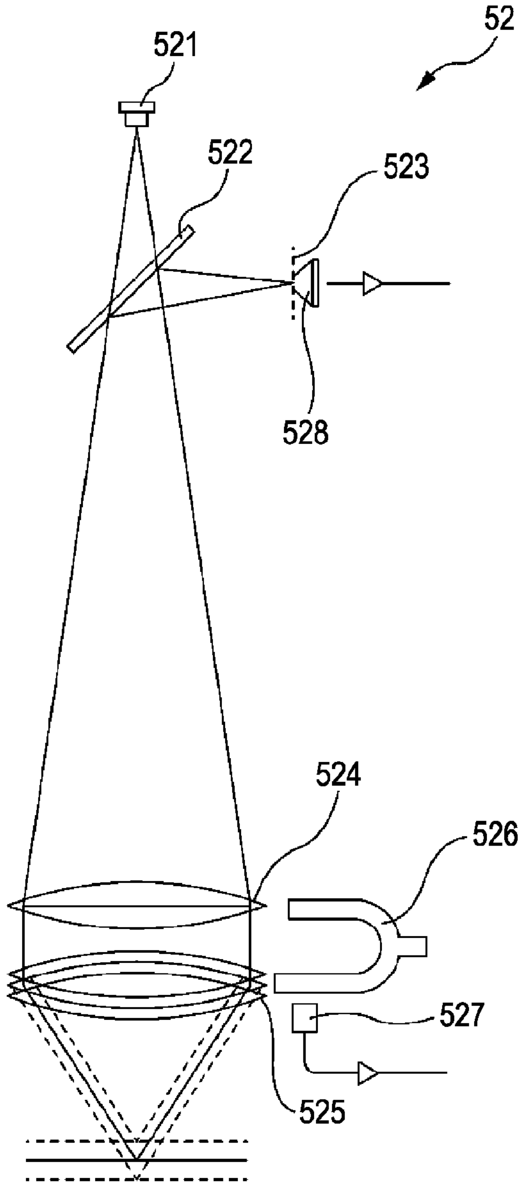
FIG. 4 is an explanatory view showing a laser focus type outer diameter measuring device 52.

FIG. 4 is an explanatory view showing the laser focus type outer diameter measuring device 52. The outer diameter measuring device 52 includes a semiconductor laser device 521, a half mirror 522, a pinhole 523, a photodetector element 528 and an amplifier for amplifying a light reception signal. The outer diameter measuring device 52 further includes a collimator lens 524, an objective lens 525, a tuning fork 526, a tuning fork position detecting sensor 527 and an amplifier for amplifying a position signal.

The semiconductor laser device 521 is adapted to radiate laser light to an object for distance measurement. The radiated laser light passes through the objective lens 525 vertically vibrated at a high speed by the tuning fork 526 to be focused on the object. The laser light is reflected by the object, and the reflected laser light passes through the half mirror 522 and the pinhole 523 to reach the photodetector element 528. With the above configuration, when the laser light is focused on the object, the reflected light is collected at one point at the position of the pinhole 523 and is incident on the photodetector element 528. At that time, the position of the tuning fork 526 is measured by means of the tuning fork position detecting sensor 527, thereby measuring the distance to the object. When the distance to the object is measured at each position, a radius (diameter) of the drum 11 at each position is obtained. Then, the value of the radius is transmitted to the controller 60.

The diameter measuring device 52 is attached to the carriage 31 so that the diameter measuring device 52 moves in the main scanning direction together with the carriage 31. As a result, it is possible to obtain the diameter of the drum 11 at each position of the head unit 40. In addition, since the drum 11 is rotated, it is possible to obtain the diameter at each position of the outer peripheral surface of the drum 11.

Note that, the outer diameter measuring device 52 can be a contact type mechanical measuring device having a part contacting the outer peripheral surface of the drum 11.

The controller 60 is adapted to control each section of the printer 1 and is equipped with a CPU 61 and a memory 62. The memory 62 stores a program and data for operating the printer 1. The CPU 61 controls the sections of the printer 1 to perform printing by executing the program stored in the memory 62.

The ink can be ejected from the heads 41 to 46 by varying an ejection timing in accordance with the variation of the outer diameter of the drum 11 under the control of the controller 60. The method for varying the ejection timing in accordance with the variation of the outer diameter of the drum 11 is described later.

The interface 63 is provided so as to couple the controller 60 of the printer 1 to a computer 110.

The computer 110 transmits print data according to an image to be printed to the printer 1 via a printer driver. The print data includes pixel data indicative of a size of an ink droplet to be ejected by each ink color with respect to each pixel of the medium.

The driving signal generating circuit 70 generates a driving signal COM described later. The driving signal generating circuit 70 acquires data regarding a waveform of the driving signal COM from the controller 60. The driving signal generating circuit 70 generates a voltage signal in accordance with the data regarding the waveform and generates the driving signal COM by power-amplifying the voltage signal. An example of the waveform of the driving signal COM is described later.

The radiation unit moving mechanism 80 is equipped with a carriage 81 for holding the ultraviolet light radiating unit 90. A belt 82 is attached to the carriage 81. A guide 83 slidably holds the carriage 81 so as to allow the carriage 81 to move in the extending direction (main scanning direction) of the guide 83. The belt 82 is configured so as to move in the main scanning direction by an output of a motor (not shown). The movement of the belt 82 in the main scanning direction causes movement of the carriage 81 in the main scanning direction. Since the movement of the belt 82 is controlled by the controller 60, the ultraviolet light radiating unit 90 moves in the main scanning direction under the control of the controller 60.

Note that the ultraviolet light radiating unit 90 is transported by the radiation unit moving mechanism 80 such that the position in the main scanning direction is coincident with the position of the head 41. In the printer 1, the UV ink deposited on the medium by being ejected from the heads 41 to 46 can be cured by the ultraviolet light.

The ultraviolet light radiating unit 90 is adapted to cure the UV ink deposited on the medium by being ejected from the heads 41 to 46 by radiating the ultraviolet light to the UV ink ejected on to the medium. The ultraviolet light radiating unit 90 is constituted by, for example, a metal halide lamp or an LED. A radiation rate of the ultraviolet light can be controlled by the controller 60. In accordance with the above configuration, an amount of radiation of the ultraviolet light can vary at each position on the medium. The ultraviolet light radiating unit 90 corresponds to the fixing section.

Arrangement of Heads

Figure 5A:
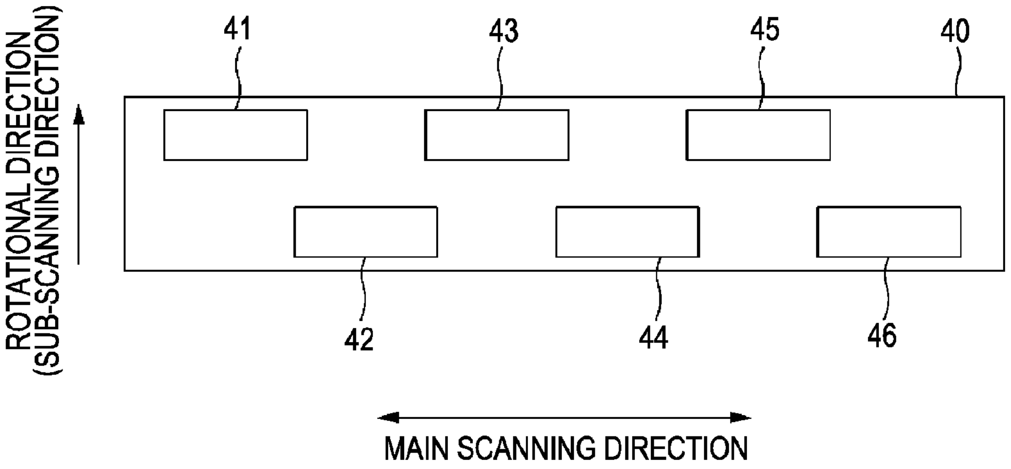
FIG. 5A is an explanatory view showing a head unit 40.

FIG. 5A is an explanatory view showing the head unit 40. The head unit 40 includes the first head 41 to the sixth head 46. FIG. 5A is a plan view of the head unit 40 viewed from the upper side. Although each of the heads of the head unit 40 could not be seen by being blocked by other elements in the actual case, the first head 41 to the sixth head 46 are made to be seen for explanation purposes.

The first head 41 to the sixth head 46 are arranged to be juxtaposed in the main scanning direction. The odd numbered heads and even numbered heads are arranged to be shifted with each other in the sub-scanning direction so that the intervals of the nozzles from the end of the first head 41 to the end of the sixth head 46 in the main scanning direction are made to be the same.

Figure 5B:
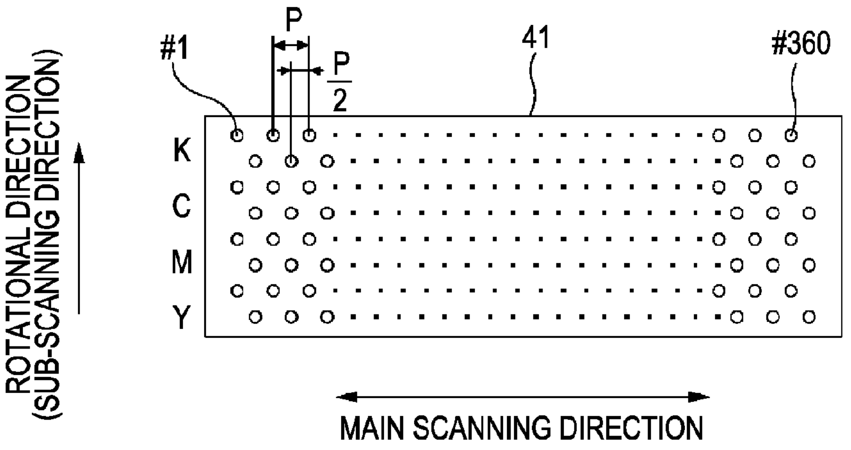
FIG. 5B is an explanatory view showing an arrangement of nozzles of a first head 41.

FIG. 5B is an explanatory view showing the nozzle arrangement of the first head 41. FIG. 5B is a plan view of the first head 41 viewed from the upper side. Although the nozzles on the first head 41 cannot be seen because they are blocked by other elements at the upper portion in the actual case, the arranged nozzles are made visible for explanation purposes.

The first head 41 includes yellow Y, magenta M, cyan C and black K nozzle rows. The first head 41 has two nozzle rows for each ink color, and the nozzle pitch P of each nozzle row is 360 dpi (dot per inch). In the first head 41, the nozzles of one row for each color are disposed so as to be offset by a half a nozzle pitch P with respect to an adjacent nozzle row. Thus, the nozzles are arranged in a staggered fashion and a half of the nozzle pitch P, i.e., P/2 in the main scanning direction can be realized. Accordingly, it is possible to realize the nozzle pitch of 720 dpi in the main scanning direction in the embodiment.

Each of the structures of the second heads 42 to the sixth heads 46 are the same as that of the first head 41. The first head 41 and the second head 42 are arranged such that a nozzle pitch between the 360th numbered nozzle in the first head 41 and the first numbered nozzle of the first head 41 is equal to the nozzle pitch P. The second head 42 to the sixth head 46 are arranged in the same manner as the above so that it is possible to realize the nozzle pitch of 720 dpi over the entire range from the nozzle at the end of the first head 41 to the nozzle at the end of the sixth head 46 in the main scanning direction.

Structure of Head

Figure 6:
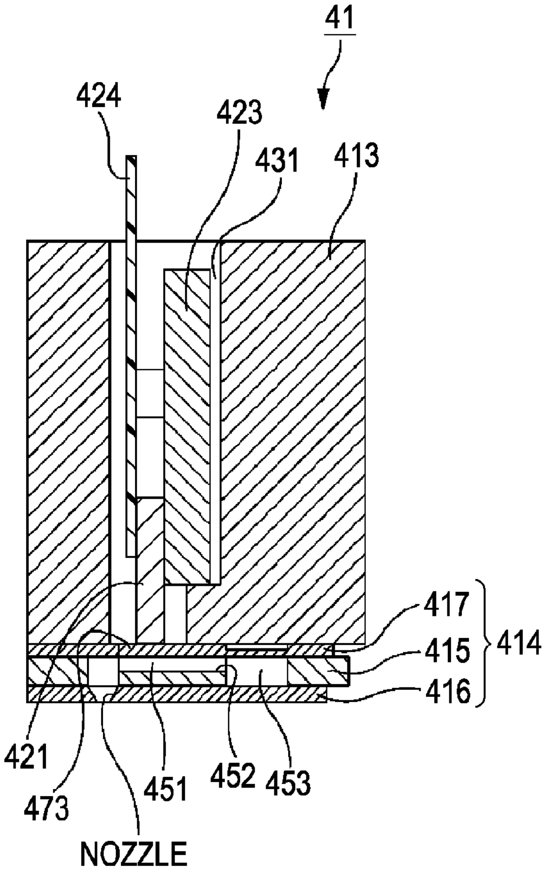
FIG. 6 is a cross sectional view of a peripheral portion of a nozzle array.

FIG. 6 is a cross sectional view of a peripheral portion of the nozzle array. Here, a structure of a drive unit for ejecting ink from each of the nozzles on the first head 41 is described with reference to FIG. 6.

The drive unit is configured of a plurality of piezoelectric elements 421, a fixing plate 423 having a group of the piezoelectric elements 421 fixed thereto and a flexible cable 424 for supplying power to each of the piezoelectric elements 421. Each of the piezoelectric elements 421 is fixed to the fixing plate 423 in the form of a cantilever. The fixing plate 423 is made of a plate member having rigidity capable of receiving a reaction force from the piezoelectric element 421. The flexible cable 424 is a flexible sheet type circuit substrate and is electrically connected to the piezoelectric element 421 at the side face of a fixing end opposite to the fixing plate 423. A head control section (not shown) of a control IC for controlling the driving of the piezoelectric elements 421 is provided at a surface of the flexible cable 424. The head control section is provided for each nozzle group of each head.

A fluid path unit 414 includes a fluid path forming substrate 415, a nozzle plate 416 and an elastic plate 417. They are laminated together such that the fluid path forming substrate 415 is sandwiched between the nozzle plate 416 and the elastic plate 417. The nozzle plate 416 is composed of a thin stainless plate having the nozzles formed thereon.

A plurality of spaces to be pressurizing chambers 451 and ink supply holes 452 are formed on the fluid path forming substrate 415 at positions corresponding to the positions of the nozzles. A reservoir 453 is a liquid reserving chamber for supplying the ink reserved in an ink cartridge to each of the pressurizing chambers 451. The reservoir 453 communicates with an end of each of the pressurizing chambers 451 via the respective ink supply holes 452. The ink in the ink cartridge is introduced into the reservoir 453 via an ink supply tube (not shown). The elastic plate 417 has an island section 473. A tip portion of a free end of the piezoelectric element 421 is bonded to the island section 473.

When a diving signal is supplied to the piezoelectric element 421 via the flexible cable 424, the piezoelectric element 421 is expanded or contracted so as to cause a volume of the pressurizing chamber 451 to be expanded or contracted. The variation of the volume of the pressurizing chamber 451 causes the pressure variation of the ink in the pressurizing chamber 451. By using the pressure variation of the ink, the ink can be ejected from the nozzle.

In the embodiment, the ink is supplied to each of the heads by being slightly pressurized. With this configuration, the ink can be surely supplied to each of the heads and can be ejected from each of the heads even when the head unit 40 is transversely placed as in the embodiment.

Driving Signal

Figure 7:
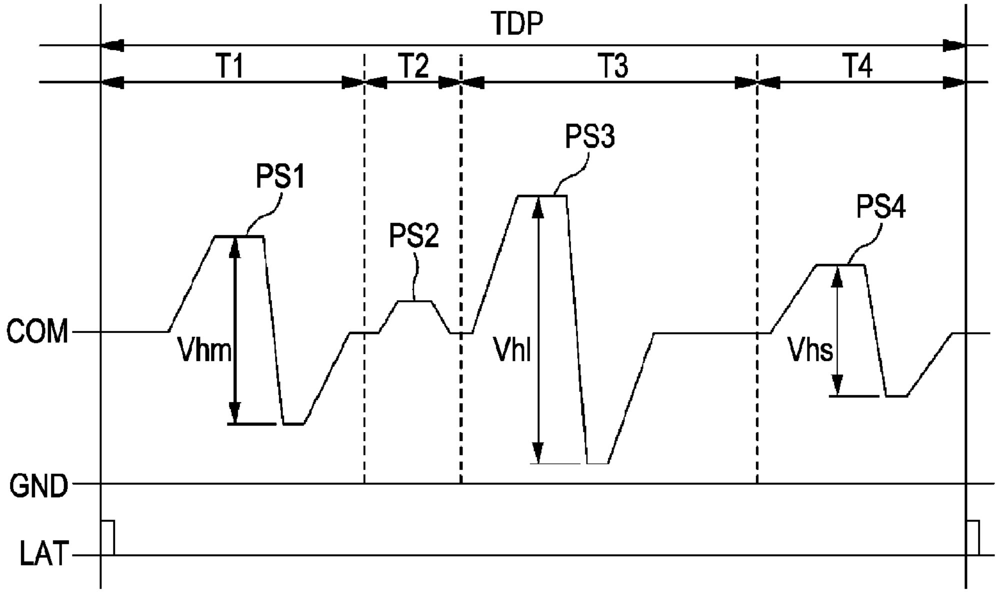
FIG. 7 is an explanatory view showing an example of the driving signal COM generated by a driving signal generating circuit 70.

FIG. 7 is an explanatory view showing an example of the driving signal COM generated by the driving signal generating circuit 70. As shown in FIG. 7, generation of the driving signal COM is repeated in a repeating cycle TDP.

The time period TDP of the repeating cycle corresponds to a time period in which the nozzle is moved by one pixel. When, for example, a printing resolution is 720 dpi, the time period TDP is one in which the nozzle is moved 1/720 inch relative to a paper sheet S. Driving pulses PS1 to PS4 of respective time periods included in the time period TDP are applied to the piezoelectric element 421 in accordance with the pixel data included in the print data so that ink droplets having different sizes are ejected to one pixel area, thereby representing a plurality of gradations.

The driving signal COM includes the driving pulse PS1 generated in a time period T1, the driving pulse PS2 generated in a time period T2, the driving pulse PS3 generated in a time period T3, and the driving pulse PS4 generated in a time period T4 in the repeating cycle.

FIG. 7 shows that Vhm is an amplitude of the driving pulse PS1, Vhl is an amplitude of the driving pulse PS3, and Vhs is an amplitude of the driving pulse PS4. The higher the amplitude of the driving pulse is, the greater the variation amount of the piezoelectric element 421 is so that an ink droplet having a greater size is ejected. As a result, ink droplets each having a size corresponding to the amplitude of the driving pulse can be ejected. In FIG. 7, the amplitude Vhl of the driving pulse PS3 is the highest, and the amplitude Vhm of the driving pulse PS1 is lower than the amplitude Vhl. The amplitude Vhs of the driving pulse PS4 is lower than the amplitude Vhm.

Consequently, when a dot with a small size is to be formed, the driving pulse PS4 is applied to the piezoelectric element 421. When a dot with an intermediate size is to be formed, the driving pulse PS1 is applied to the piezoelectric element 421. When a dot with a large size is to be formed, the driving pulse PS3 is applied to the piezoelectric element 421. The driving pulse PS2 is a fine vibration pulse for finely vibrating a meniscus and is applied to the piezoelectric element 421 when a dot is not formed. Thus, the driving pulse PS4 is applied for ejecting an ink droplet of a dot with a small size, the driving pulse PS1 is applied for ejecting an ink droplet of a dot with an intermediate size, and the driving pulse PS3 is applied for ejecting an ink droplet of a dot with a large size.

The driving signal COM is generated on the basis of a generation timing of a latch signal LAT described later. An ejection timing of the ink can be shifted by advancing or delaying the generation timing of the latch signal LAT.

Printing Method

Figure 8:
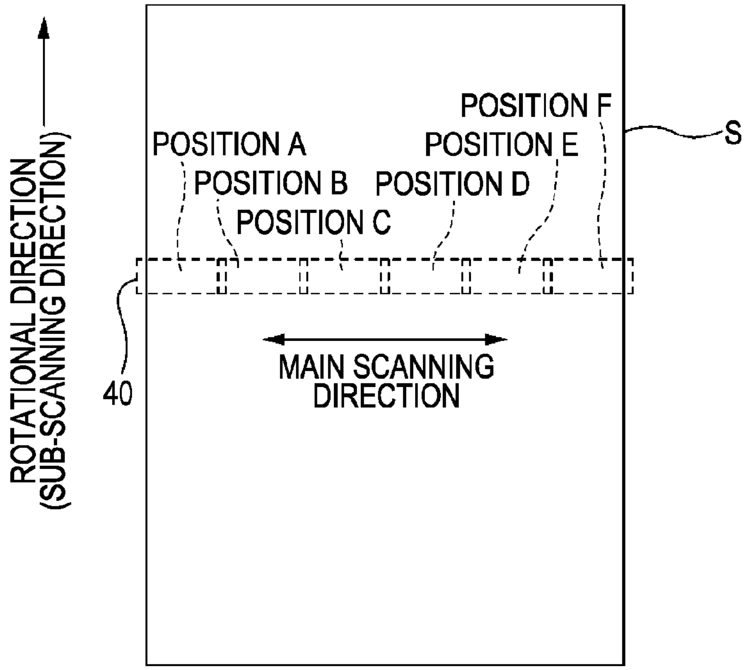
FIG. 8 is an explanatory view of a position of the head unit 40 relative to a paper sheet S in the printing.

FIG. 8 is an explanatory view of a position of the head unit 40 relative to a paper sheet S in the printing. While there are various methods for printing on the paper sheet S held on the drum 11, one example of an image forming method is described below.

First, upon starting the printing after the paper sheet S is set on the drum 11, rotation of the drum 11 is started. When the rotation of the drum 11 reaches a constant speed, the head unit 40 moves to a position A. The head unit 40 stays at the position A and ejects an ink droplet. While the paper sheet S is held on the drum 11 and is rotated, printing on a portion including the position A in the sub-scanning direction is performed. The drum 11 is rotated several to several hundreds times. During the rotation of the drum 11, ejection of the ink is carried out so that the printing on the portion including the position A in the sub-scanning direction is completed. After the completion of the printing on the portion including the position A in the sub-scanning direction, the head unit 40 is moved to a position B. The printing on a portion including the position B in the sub-scanning direction is completed in the same manner as in the case of the position A. An operation similar to the above is repeated up to a position F, thereby performing the printing on the entirety of the paper sheet S.

While, in the above description, the printing is performed such that the head unit 40 is moved sequentially from the position A to the position F, it is possible to move the head unit 40 randomly in the main scanning direction without moving the head unit sequentially.

Along with the movement of the head unit 40, the ultraviolet light radiating unit 90 is moved in the main scanning direction by the radiating unit moving mechanism 80 so as to position the ultraviolet light radiating unit 90 at the same position as the head unit 40 in the main scanning direction. The ultraviolet light radiating unit 90 radiates the ultraviolet light so as to cure the UV ink deposited on the paper sheet S. At that time, the radiation rate can arbitrarily vary in a range from 0% to 100%. With the above configuration, it is possible to radiate to the paper sheet S the ultraviolet light in the amount according to an image to be formed on the paper sheet S.

As described above, while the printing is performed by moving the head unit 40 in the main scanning direction of the drum 11, the ultraviolet light radiating unit 90 radiates the ultraviolet light by being moved in the main scanning direction of the drum 11. When the radiation rate of the ultraviolet light varies in accordance with a picture to be formed, the temperature of a part of a region of the drum 11 may increase so that a difference in temperature is generated. When the temperature is high, the radius of the drum is increased, and vice versa. As a result, the difference in temperature causes the radius of the drum 11 to vary depending on its position.

Figure 9:
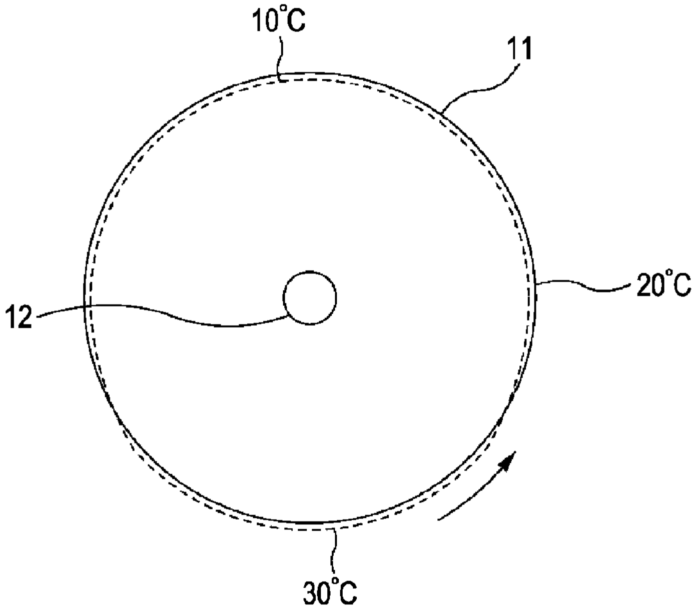
FIG. 9 is an explanatory view showing an outer diameter of a drum 11 at a temperature.

FIG. 9 is an explanatory view showing the outer diameter of the drum 11 at different temperatures. In FIG. 9, the contour of the drum 11 at temperature of 20° C. is indicated by a solid line as a case of a reference radius. A dotted line indicates that when the drum 11 becomes partially at temperature of 10° C., the diameter becomes smaller than that at the temperature of 20° C. Also, another dotted line indicates that when the drum 11 becomes partially at temperature of 30° C., the diameter becomes greater than that at the temperature of 20° C. Thus, when the radiation rate of the ultraviolet light varies depending on the position of the drum 11, the difference in temperature between different positions on the drum 11 is generated.

Figure 10:
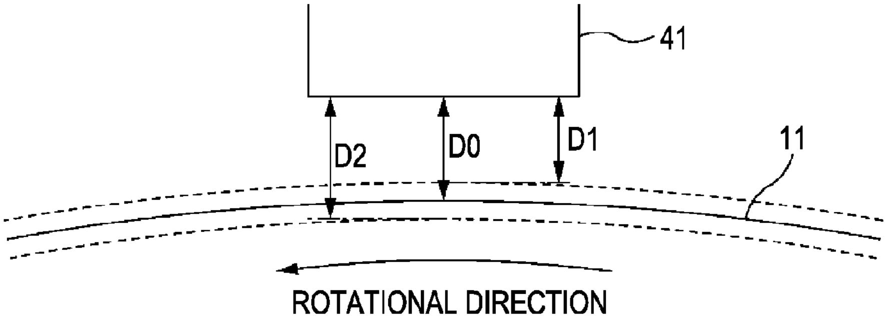
FIG. 10 is an explanatory view showing a distance between the first head 41 in the head unit 40 and the surface of the drum 11.

FIG. 10 is an explanatory view showing a distance between the first head 41 in the head unit 40 and the surface of the drum 11. In FIG. 10, D0, D1, and D2 respectively designate distances between the first head 41 and the surface of the drum 11 at different temperatures. The distance D0 is in a case where the radius of the drum 11 is the reference radius. The distance D1 is in a case where the radius of the drum 11 is increased with the increase of temperature. The distance D2 is in a case where the radius of the drum 11 is reduced with the decrease of temperature. Thus, the radius of the drum 11 varies by virtue of the temperature so that the distance between the head 41 and the surface of the drum 11 varies. As a result, the deposited position of ink ejected from the head on a paper sheet is deviated by virtue of the temperature. When the temperature varies depending on the portion at the surface of the drum 11, the deposited position of the ink is not constant depending on the portion, resulting in printing of a deformed image different from a desired image.

Figure 11:
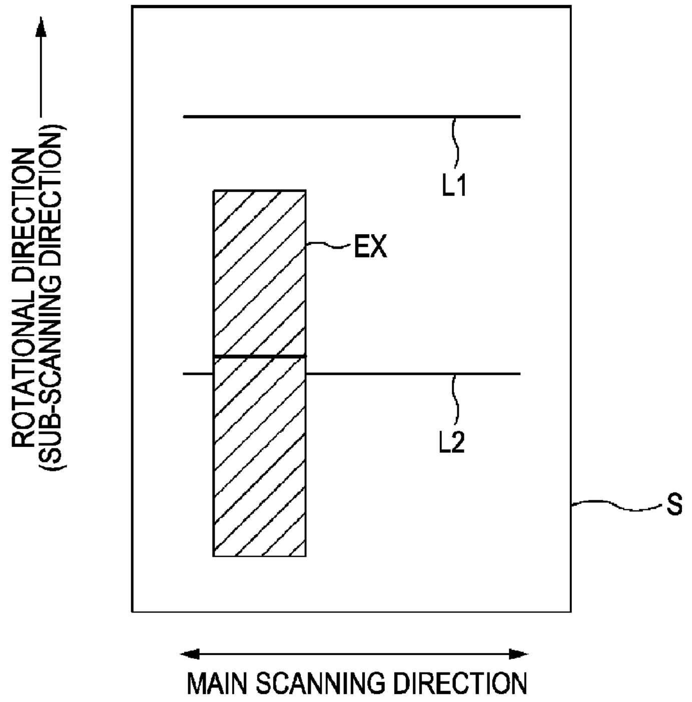
FIG. 11 is an explanatory view showing an influence to forming of an image when the diameter of the drum 11 varies.

FIG. 11 is an explanatory view showing an influence to forming of an image when the diameter of the drum 11 varies. In FIG. 11, a condition that the paper sheet S held on the drum 11 is spread, is illustrated. A shaded region on the paper sheet S corresponds to a region EX of the drum 11 where the radius is greater than the reference radius by virtue of the partial expansion of the drum 11. A region out of the shaded region on the paper sheet S corresponds to a portion of the drum 11 whose radius is the reference radius.

When the radius of the drum 11 is the same as the reference radius over the entire portion in the main scanning direction, a position of a dot is not shifted in the rotational direction (sub-scanning direction). It is because that the distance between the head and the surface of the drum 11 is always D0 in the main scanning direction as shown in FIG. 10. When a line L1 extending in the main scanning direction is formed on the above region, a straight line without a shift in the sub-scanning direction can be formed.

On the other hand, there may be a case where the drum 11 has a portion like the region EX in which the radius of the drum 11 is different from that of any other portion. At that time, although the distance between the head and the surface of the drum 11 is D0 (shown in FIG. 10) when the drum 11 has the reference radius, the distance between the head and the surface of the drum 11 in the region EX is D1 (shown in FIG. 10). With the above configuration, the ink reaches the surface in the region EX earlier than in the region having the reference radius. As a result, even when a line similar to the above line L1 is to be formed, the line in the region EX is formed so as to be shifted in the sub-scanning direction as compared to any other region.

When the radius varies depending on the position in the outer periphery of the drum 11, a dot is formed so as to be shifted so that an image is different from a desired image. Therefore, in the embodiment, in accordance with variation of the diameter of the drum 11 measured by the diameter measuring device 52, an ejection timing of ink from the head unit 40 varies by a method described below.

Figure 12A:
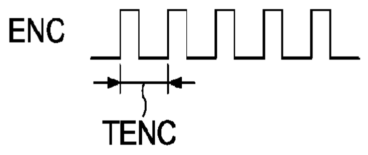
FIG. 12A is an explanatory view showing a print timing signal PTS with respect to an encoder pulse ENC.

FIG. 12A is an explanatory view showing a cycle of an encoder pulse ENC. The encoder pulse ENC shown in FIG. 12A is acquired from the rotary encoder 51. An encoder cycle TENC is a cycle of the rotary encoder 51 per one pulse.

Figure 12B:
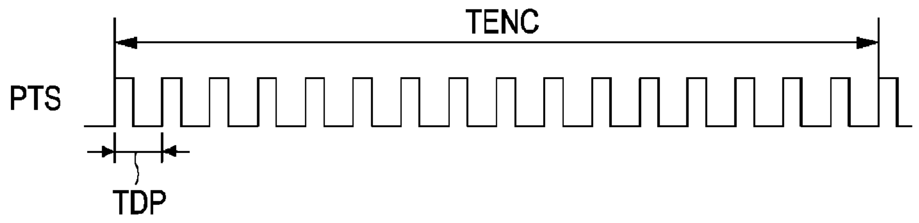
FIG. 12B is an explanatory view showing the print timing signal PTS with respect to the encoder pulse ENC.

FIG. 12B is an explanatory view showing a print timing signal PTS with respect to the encoder pulse ENC. Pulses of the print timing signal PTS are shown in FIG. 12B. The print timing signal PTS is generated by dividing the encoder cycle TENC into sixteen parts. The cycle of the print timing signal PTS is TDP which is a time period of one cycle of the driving signal. Since the print timing signal PTC is generated based on the encoder pulse ENC, it is possible to generate the print timing signal PTS in accordance with the rotational position of the drum 11 irrespective of the angular velocity of the drum 11.

Figure 12C:
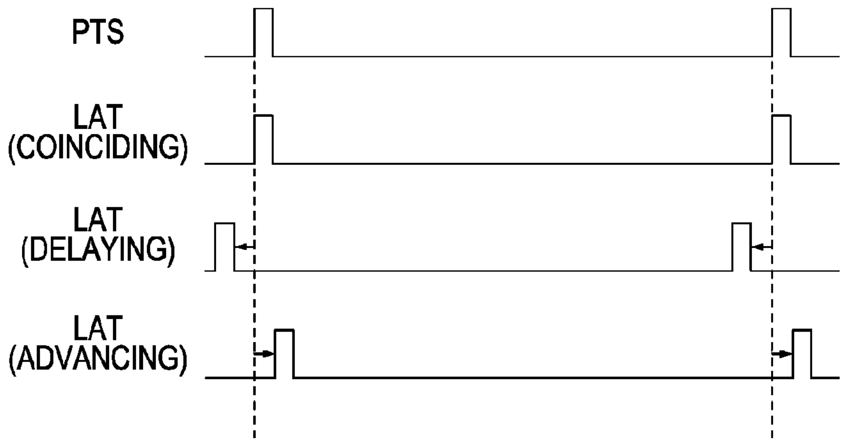
FIG. 12C is an explanatory view showing a relationship between the print timing signal PTS and a latch signal LAT.

FIG. 12C is an explanatory view showing a relationship between the print timing signal PTS and the latch signal LAT. In this embodiment, the latch signal LAT is output so as to be coincident with the print timing signal PTS, as a general rule.

On the other hand, when the radius of the drum 11 is greater than the reference radius, the distance between the head and the surface of the drum 11 becomes shorter so that the ink reaches the surface earlier. In this embodiment, in order to cancel the above phenomenon, the latch signal LAT can be generated so as to be delayed with respect to a generation timing of the print timing signal PTS. With the above configuration, when the radius of the drum 11 is increased to be greater than the reference radius, the ejection timing of the ink is delayed in accordance with the degree of the increase so that it is possible to control the arrival timing of the ink.

In addition, when the radius of the drum 11 is smaller than the reference radius, the distance between the head and the surface of the drum 11 becomes longer so that the ink reaches the surface late. In this embodiment, in order to cancel the above phenomenon, the latch signal LAT can be generated so as to be advanced with respect to the generation timing of the print timing signal PTS. With the above configuration, when the radius of the drum 11 is decreased to be smaller than the reference radius, the ejection timing of the ink is delayed in accordance with the degree of the decrease so that it is possible to control the arrival timing of the ink.

A range in which the timing of the latch signal can be shifted is within one cycle TDP of the print timing signal PTS. As the cycle TDP is equal to one cycle of the driving signal COM, the range for shifting is within one pixel so that the cycle TDP can be used for fine adjustment when a pixel is shifted in the sub-scanning direction.

Figure 13:
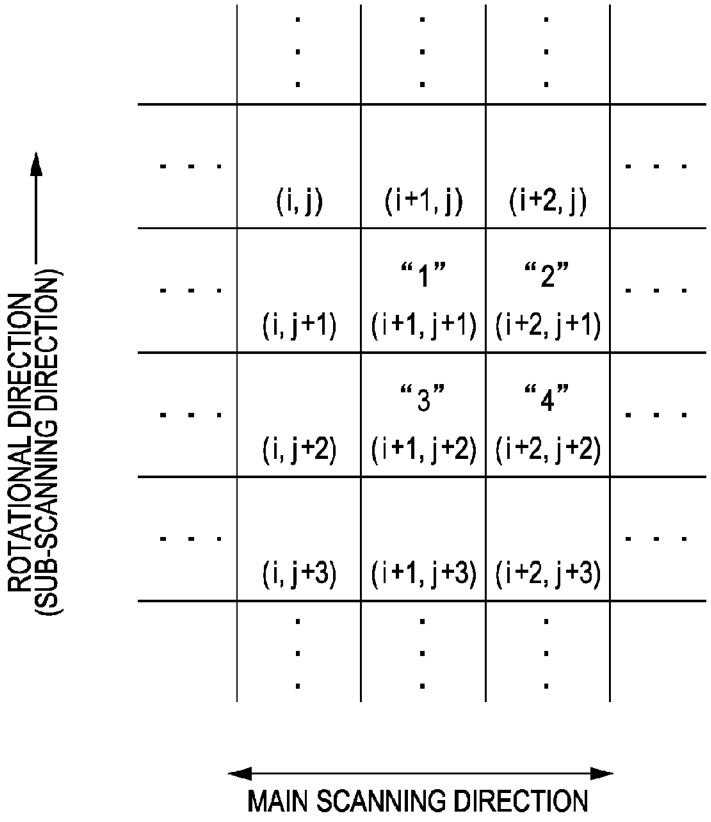
FIG. 13 is an explanatory view showing an arrangement of dots designated by pixel data (first case).

FIG. 13 is an explanatory view showing an arrangement of dots designated by pixel data (first case). In FIG. 13, each of compartments arranged in a lattice structure is a pixel. The position of each pixel is indicated by a two-dimensional coordinate. In FIG. 13, the main direction is indicated and the rotational direction of the (sub-scanning direction) is indicated in a direction perpendicular to the main scanning direction.

Each pixel data indicates where on a paper sheet a dot is to be formed. FIG. 13 visually represents arrangement of the dots indicated by the pixel data. Here, it is assumed that temperature of the drum 11 is 20° C. and the radius of the drum 11 is the reference radius. Under the above condition, the dots are to be formed on positions having coordinates (i+1, j+1), (i+2, j+1), (i+1, j+2) and (i+2, j+2) on the basis of the pixel data.

On the other hand, when the temperature of the drum 11 is lower than 20° C. (for example, 10° C.), the radius of the drum 11 is smaller than the reference radius. As a result, the distance from the head to the surface of the drum 11 is increased so that a time period from the ejection of ink to the arrival of the ink to the surface is increased. Therefore, the arrival of the ink is advanced so that the ink is expected to be deposited to a position where the ink is to be deposited when the radius of the drum 11 is the reference radius. To do so, the image data is regenerated so as to shift the arrangement of the dots.

Figure 14:
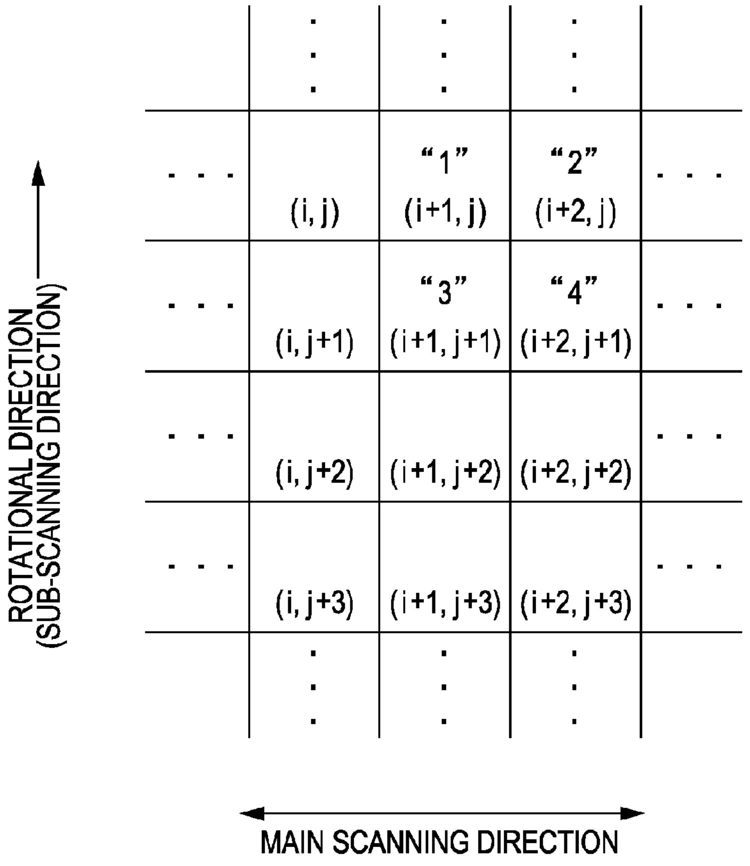
FIG. 14 is an explanatory view showing an arrangement of dots designated by pixel data (second case).

FIG. 14 is an explanatory view showing formed dots to respective pixels (second case). Here, it is assumed that the temperature of the drum 11 is lower than 20° C. and the radius of the drum 11 is smaller than the reference radius. As described above, the pixel data is regenerated in order to advance the ejection of the ink. In a method for regenerating the pixel data, a position of each dot is shifted forward in the rotational direction. For example, pixel data is changed such that a dot (indicated by "1") on the coordinate (i+1, j+1) in FIG. 13 is changed to a dot on the coordinate (i+1,j) positioned forward in the rotational direction.

Consequently, even when the radius of the drum 11 is decreased to be smaller than the reference radius and the distance between the head and the surface of the drum 11 is increased, the ejection timing of the ink is advanced so that it is possible to deposit the ink on a position where the ink is to be originally deposited when the radius of the drum 11 is the reference radius.

On the other hand, when the temperature of the drum 11 is higher than 20° C. (e.g., 30° C.), the radius is greater than the reference radius. As a result, the distance between the head to the surface of the drum 11 is decreased so that the time period from the ejection of the ink to the arrival becomes shorter. Therefore, it is necessary for the ink, by delaying the arrival of the ink, to be deposited on a position where the ink is to be originally deposited when the radius of the drum 11 is the reference radius.

Figure 15:
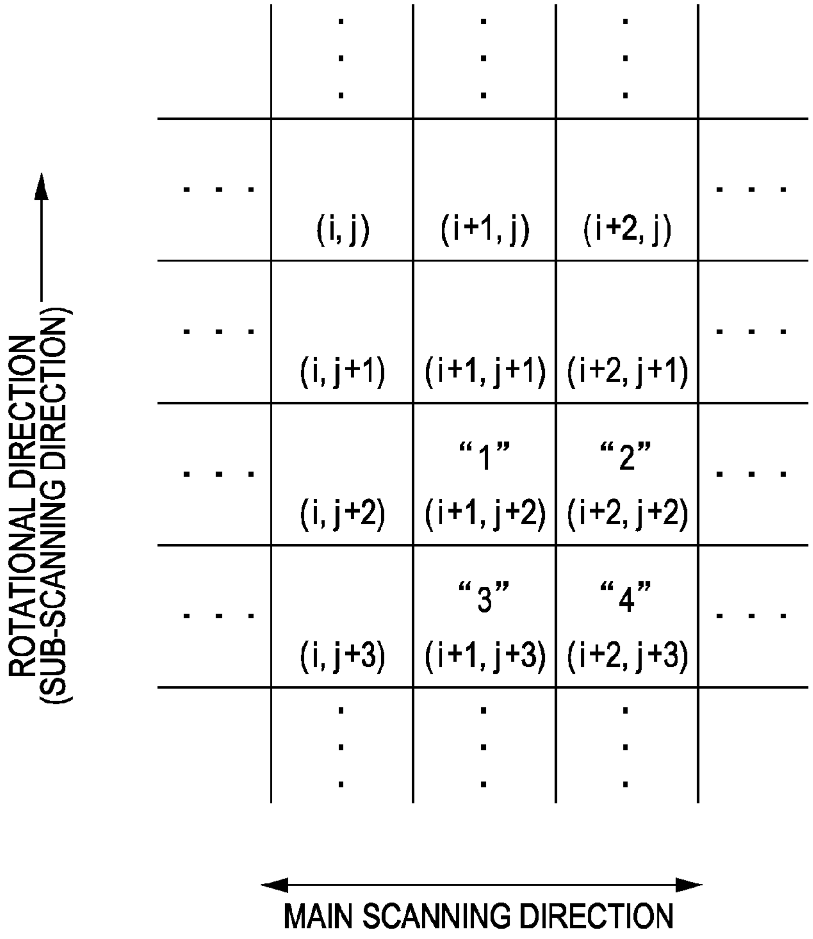
FIG. 15 is an explanatory view showing an arrangement of dots designated by pixel data (third case).

FIG. 15 is an explanatory view showing formed dots to respective pixels (third case). Here, it is assumed that the temperature of the drum 11 is higher than 20° C. and the radius of the drum 11 is grater than the reference radius. As described above, the pixel data is regenerated in order to delay the ejection of the ink. In a method for regenerating the pixel data, a position of each dot is shifted backward in the rotational direction. For example, pixel data is changed such that a dot on the coordinate (i+1, j+1) in FIG. 13 is changed to a dot on the coordinate (i+1,j+2) which is positioned backward in the rotational direction.

Consequently, even when the radius of the drum 11 is increased to be greater than the reference radius and the distance between the head and the surface of the drum 11 is decreased, the ejection timing of the ink is delayed so that it is possible to deposit the ink on a position where the ink is to be originally deposited when the radius of the drum 11 is the reference radius.

Note that, for ease of explanation, while the position of the dot is moved in the rotational direction by one pixel, it is possible to modify the pixel data so as to move the position by pixels more than one pixel depending on a degree of the expansion of the drum 11.

As described above, since the pixel data is modified and the timing of the latch signal LAT is shifted, the position of the dot is moved in the sub-scanning direction so that the deposited position of the dot can be controlled.

In the embodiment, the outer diameter measuring device 52 is attached to the carriage 31, it is possible to attach two outer diameter measuring devices 52' to both ends of the drum 11 in the axial direction (see FIG. 1), respectively. The two outer diameter measuring devices 52' respectively acquire the diameters at both ends of the drum 11. It is possible to complement the diameter at an intermediate portion between the two outer diameter measuring devices 52' in the main scanning direction by using measured values obtained by both of the outer diameter measuring devices 52'.

While the head unit 40 and the ultraviolet light radiating unit 90 are configured so as to be moved in the main scanning direction, it is possible to provide a plurality of head units 40 and a plurality of ultraviolet light radiating unit 90. In the above case, they may be arranged in the main scanning direction. In a case where the ultraviolet radiation rates are different from each other between the regions even in the above configuration, the diameters of the drum 11 are different from each other between the regions. However, as the ejection timing of the ink can vary on the basis of the measured diameter of the drum 11, it is possible to form an adequate image.

In addition, it is explained that the printing is performed while simultaneously moving the head unit 40 and the ultraviolet light radiating unit 90 in the main scanning direction. However, the configuration is not limited to the above. The position of the radiation of the ultraviolet light can be moved in the main scanning direction so as to trace the position of the ejection of ink. For this reason, the ultraviolet light radiating unit 90 can be moved in the main scanning direction by being slightly delayed from the movement of the head unit 40.

Another Embodiment

While, in the above embodiment, the ink jet printer is specifically described as a fluid ejecting apparatus, it is possible to specify the fluid ejecting apparatus capable of ejecting a liquid other than ink (a liquid including particles of a function material dispersed therein or a fluid such as a gel) or a fluid other than a liquid (a solid material capable of being ejected like a liquid). For example, it is possible to apply the invention to a liquid medium ejecting apparatus for ejecting a liquid medium including a material such as an electrode material or a colorant dispersed or dissolved therein, the liquid medium ejecting apparatus being used in a manufacturing process of a liquid display device, an EL (electroluminescent) display device, or a surface light emitting device. It is also possible to apply the invention to a liquid ejecting apparatus for ejecting a living organic material used in a manufacturing process of a biochip, and a liquid ejecting apparatus for ejecting a liquid to be a specimen used as a precision pipet.

In addition, it is also possible to list up a liquid ejecting apparatus for ejecting a grease to a precision machine such as a watch or a camera in a pinpoint manner, a liquid ejecting apparatus for ejecting on a substrate a liquid of a transparent resin such as an ultraviolet curable resin in order to form a fine hemispheric lens (optical lens) to be used for an optical communication element, a liquid ejecting apparatus for ejecting an acid or alkaline etching liquid for etching a substrate, a fluid medium ejecting apparatus for ejecting a gel, and a fine particle ejection recorder for ejecting a solid material such as toner particles.

In the embodiment, the ink is not limited to a UV ink. The ultraviolet light radiating unit 90 can be a heater for advancing drying of the ink. The ink in the above case can be an aqueous ink or an oily ink.

The above embodiments are for ease of understanding and do not limit the invention. The invention can be changed or modified or include an equivalent without departing from the scope of the invention.

What is claimed is:

1. A fluid ejecting method, comprising:

rotating a medium by allowing the medium to be held on a periphery of a drum;

ejecting a fluid on to the medium held on the periphery of the drum;

fixing the fluid ejected on to the medium by the fixing section;

measuring a variation of the diameter of the drum caused by heating the drum; and varying an ejection timing of the fluid in accordance with the variation of the diameter of the drum, wherein the variation of the diameter is measured by a laser focus type outer diameter measuring device.

2. The fluid ejecting method according to claim 1, wherein the fixing section is a light radiating device.

3. The fluid ejecting method according to claim 1, wherein the fixing section is a heater.

4. A fluid ejecting apparatus, comprising:

a drum that rotates while holding a medium on its outer periphery;

a head that ejects a fluid on to the medium held on the periphery of the drum;

a fixing section that fixes the fluid ejected on to the medium by the head;

a laser focus type outer diameter measuring device that measures a diameter of the drum; and a controller that varies an ejection timing of the fluid ejected from the head based upon the variation of the diameter of the drum measured by the laser focus type outer diameter measuring device.

5. The fluid ejecting apparatus according to claim 4, wherein the fixing section is a light radiating device.

6. The fluid ejecting apparatus according to claim 4, wherein the fixing section is a heater.

* * * * *